US012781862B2

(12) United States Patent
Bolling et al.

(10) Patent No.: US 12,781,862 B2
(45) Date of Patent: Nov. 3, 2026

(54) HYDRAULIC VALVE SPOOL THROUGH WHICH A FLUID CAN FLOW, BIDIRECTIONAL CONTROL VALVE, AND METHOD

(71) Applicant: ETO MAGNETIC GMBH, Stockach (DE)

(72) Inventors: Sebastian Bolling, Uhldingen-Mühlhofen (DE); Timo Rigling, Moos (DE); Luca Veser, Radolfzell (DE)

(73) Assignee: ETO MAGNETIC GmbH, Stockach (DE)

( * ) Notice: Subject to any disclaimer, the term of this patent is extended or adjusted under 35 U.S.C. 154(b) by 89 days.

(21) Appl. No.: 18/721,829

(22) PCT Filed: Dec. 19, 2022

(86) PCT No.: PCT/EP2022/086736
§ 371 (c)(1),
(2) Date: Oct. 14, 2024

(87) PCT Pub. No.: WO2023/117961
PCT Pub. Date: Jun. 29, 2023

(65) Prior Publication Data

US 2025/0067351 A1 Feb. 27, 2025

(30) Foreign Application Priority Data

Dec. 23, 2021 (DE) ..................... 10 2021 134 609.6

(51) Int. Cl.
*F16K 11/07* (2006.01)
*B60G 17/08* (2006.01)
(Continued)

(52) U.S. Cl.
CPC .......... *F16K 11/0716* (2013.01); *B60G 17/08* (2013.01); *F15B 1/265* (2013.01);
(Continued)

(58) Field of Classification Search
CPC ... F16K 11/0716; F16K 31/383; B60G 17/08; B60G 2202/415; B60G 2204/62;
(Continued)

(56) References Cited

U.S. PATENT DOCUMENTS 4,531,540 A * 7/1985 Meister .................. G05D 16/10 137/489
4,625,756 A * 12/1986 Riedel ........................ F01N 3/38 137/492.5
(Continued)

FOREIGN PATENT DOCUMENTS

DE 8704728 U1 7/1987
DE 3830828 A1 3/1990
(Continued)

OTHER PUBLICATIONS

Search Report received in related German Application No. 10 2021 134 609.6, mailed Aug. 31, 2023, 9 pages.
(Continued)

*Primary Examiner* — William M Mccalister
(74) *Attorney, Agent, or Firm* — Womble Bond Dickinson (US) LLP

(57) ABSTRACT

A flow-through hydraulic valve slide (14*a-b*), in particular for a control valve (10*a-b*) for regulating damping characteristics of shock absorbers, has at least one hydraulic link valve (12*a-b*) for influencing a flow-through of the valve slide (14*a-b*), wherein the hydraulic link valve (12*a-b*) comprises at least one first control port (16*a-b*), at least one second control port (18*a-b*), at least one entry (20*a-b*, 36*a-b*)
(Continued)

Figure 1:
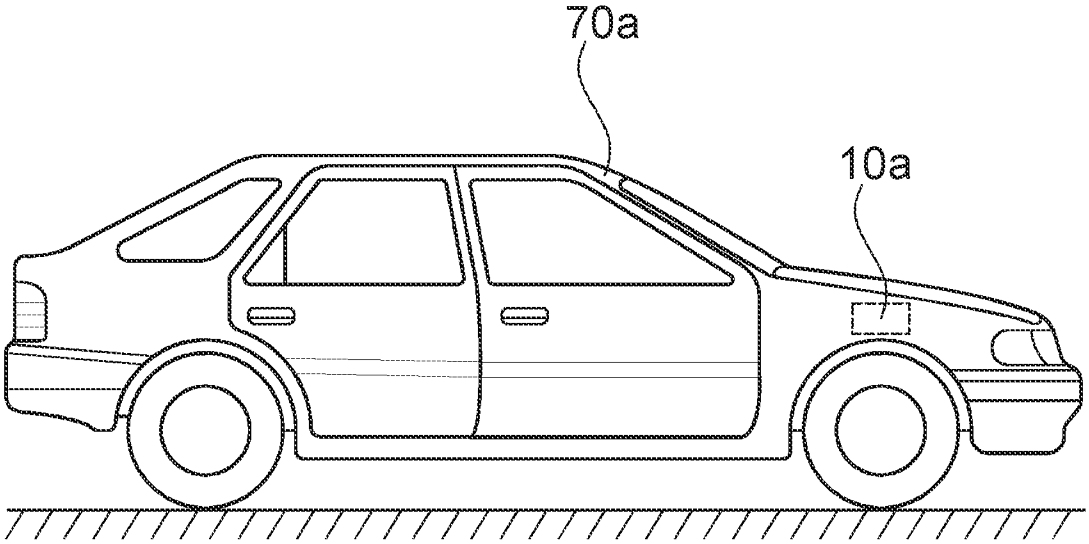

and at least one exit (22_a-b,_ 40_b_) which can be opened in an interchangeable manner at least towards the entry (20_a-b_).

19 Claims, 7 Drawing Sheets

(51) Int. Cl.

| | |
|---|---|
| ***F15B 1/26*** | (2006.01) |
| ***F15B 13/02*** | (2006.01) |
| ***F15B 13/04*** | (2006.01) |
| ***F16F 9/34*** | (2006.01) |
| ***F16F 9/516*** | (2006.01) |
| ***F16K 31/383*** | (2006.01) |

(52) U.S. Cl.
CPC ........ *F15B 13/028* (2013.01); *F15B 13/0401* (2013.01); *F16F 9/3405* (2013.01); *F16F 9/5165* (2013.01); *F16K 31/383* (2013.01); *B60G 2202/415* (2013.01); *B60G 2204/62* (2013.01); *B60G 2500/114* (2013.01); *B60G 2600/21* (2013.01); *B60G 2800/162* (2013.01); *B60G 2800/916* (2013.01)

(58) Field of Classification Search
CPC ........ B60G 2500/114; B60G 2500/221; B60G 2600/21; B60G 2800/162; B60G 2800/916; F15B 1/265; F15B 13/028; F15B 13/0401; F16F 9/5165; F16F 9/3405; Y10T 137/7765; Y10T 137/7766; Y10T 137/7767
USPC ....... 137/490, 491, 489.3, 489.5, 492, 492.5
See application file for complete search history.

(56) References Cited

U.S. PATENT DOCUMENTS

| | | | | |
|---|---|---|---|---|
| 5,036,877 | A * | 8/1991 | Distler | F16K 17/105 137/493 |
| 7,513,111 | B2 * | 4/2009 | Daigre | F16H 61/4043 137/493 |
| 9,212,718 | B2 | 12/2015 | Heyn et al. | |
| 2003/0011162 | A1 * | 1/2003 | Wallestad | B60G 17/056 280/124.157 |
| 2005/0265823 | A1 * | 12/2005 | Wiggins | F16K 31/1635 415/151 |
| 2006/0213562 | A1 * | 9/2006 | Jacobson | F15B 13/024 137/493 |
| 2013/0340865 | A1 | 12/2013 | Manger et al. | |
| 2013/0341540 | A1 | 12/2013 | Manger et al. | |
| 2017/0152910 | A1 | 6/2017 | Schaffelhofer et al. | |
| 2023/0313893 | A1 * | 10/2023 | Otremba | F16K 31/0606 137/512 |

FOREIGN PATENT DOCUMENTS

| | | | |
|---|---|---|---|
| DE | 4025880 | A1 | 2/1992 |
| DE | 102007005466 | A1 | 8/2007 |
| DE | 102015223932 | A1 | 6/2017 |
| EP | 0351537 | A2 | 1/1990 |
| EP | 3012483 | A1 | 4/2016 |
| KR | 20080008149 | A | 1/2008 |

OTHER PUBLICATIONS

Search Report received in related International Application No. PCT/EP2022/086736, mailed May 23, 2023, 2 pages.
Preliminary Report on Patentability received in related International Application No. PCT/EP2022/086736, mailed Jun. 20, 2024, 8 pages.

* cited by examiner

HYDRAULIC VALVE SPOOL THROUGH WHICH A FLUID CAN FLOW, BIDIRECTIONAL CONTROL VALVE, AND METHOD

CROSS-REFERENCE TO RELATED APPLICATIONS

This patent application is a U.S. national stage application of international patent application PCT/EP2022/086736, filed on Dec. 19, 2022, which is based on and claims priority to German patent application DE 10 2021 134 609.6, filed on Dec. 23, 2021, the contents of which are incorporated herein by reference.

PRIOR ART

The invention concerns a valve slide, a control valve, a vehicle and a method. It has been proposed that closed volumes which are displaced or filled by a movement of a valve slide are equipped with large leakages in bearing gaps in order to compensate the surplus or deficient volumes.

The objective of the invention is in particular to provide a generic device with advantageous damping properties. The objective is achieved according to the invention.

Advantages of the Invention

A flow-through hydraulic valve slide, in particular for a control valve for regulating damping characteristics of shock absorbers, is proposed, with at least one hydraulic link valve for influencing a flow-through of the valve slide, wherein the hydraulic link valve comprises at least one first control port, at least one second control port, at least one entry and at least one exit, preferably at least two exits, which can be opened in an interchangeable manner at least towards the entry. In this way, advantageous damping properties are achievable. Advantageously, a damping characteristic for shock absorbers is achievable, which at the same time has high dynamics and low overall leakage. Advantageously, a conflict of objectives between dynamics and leakage, which occurs in known control valves (there, high dynamics generally means high leakage) can be resolved by the invention. Advantageously, due to low overall leakage, regulation is enabled even at low damper speeds, in particular as a particularly low opening point of the control valve is achievable. Advantageously, the overall leakage can be optimized independently of the dynamics to be achieved, for example as it is possible either to significantly reduce leakage (functional advantage) with a constant manufacturing tolerance or as it is advantageously possible to augment manufacturing tolerances without producing particularly disadvantageous effects (cost advantage).

In particular, the valve slide implements a component of the control valve for regulating the damping characteristics of shock absorbers. The valve slide in particular separates a pressure side of a shock absorber comprising the control valve from a pressure-free side of the shock absorber. In particular, the pressure side may change depending on the application of a tensile force or of a compressive force. Opening of the separation of pressure side and pressure-free side by the valve slide will induce damping by means of an oil flow. In particular, the valve slide comprises hydraulic effective surfaces. In particular, the valve slide comprises at least one hydraulic effective surface and at least one further hydraulic effective surface, wherein the hydraulic effective surface and the further hydraulic effective surface(s) are arranged on the valve slide relative to each other in such a way that they hydraulically counteract each other, in particular during a damping process, and wherein the tensile or compressive forces of the shock absorber that are to be damped in particular act on the hydraulic effective surfaces. In particular, the valve slide can be at least section-wise flowed through by a fluid, for example an oil, preferably a hydraulic oil. In particular, the flow-through capability of the valve slide achieves that oil, in particular hydraulic oil, can be pumped back and forth between a pressure fluid reservoir of the control valve and a pressure-free (pressure fluid) tank of the shock absorber. Herein in particular the assignment of the pressure-free region, i.e. of the pressure-free (pressure fluid) tank, changes depending on the flow-through direction. This switchover is advantageously achieved substantially without substantial leakage losses and without undesired build-up of substantial counter-forces. This advantageously allows achieving high switching dynamics of the control valve with a chassis regulation starting already at small chassis vibrations. In particular, the valve slide can be flowed through bidirectionally. In particular, the valve slide comprises at least four different flow-through paths. In particular, the hydraulic link valve is configured for influencing a flow-through of at least two of the four flow-through paths, preferably of all four flow-through paths. In particular, the link valve is integrated in the valve slide. In particular, the link valve is completely enclosed by the valve slide. In particular, at least one of the control ports, preferably all control ports, at the same time forms/form entries of the link valve. In particular, the hydraulic pressures applied at the control ports of the link valve control the link valve, in particular the valve position of the link valve. In particular, the link valve is free of an electronic, magnetic and/or mechanical control. In particular, the link valve is controlled/operated in a purely fluid-mechanical manner. In particular, the link valve is flowed through by the pressure fluid. In particular, the control ports are actuatable/actuated by pressure signals. In particular, the entry may coincide with at least one of the control ports. In particular, the link valve may comprise two entries, wherein the two entries may coincide with respectively different control ports. Alternatively, it is conceivable that at least one entry is realized separately from a control port and/or that at least one control port does not form an entry into which a fluid flowing through the link valve can enter.

Furthermore, it is proposed that the flow-through hydraulic valve slide comprises a sealing surface that is configured to tightly sit on a valve seat of the control valve, wherein the first control port is hydraulically connected to a first side of the valve slide, wherein the second control port is hydraulically connected to a second side of the valve slide, and wherein the two sides to which the control ports are hydraulically connected are arranged on the valve slide in such a way that the first side and the second side can be sealed relative to each other by the sealing surface. In this way, advantageous damping properties are achievable. Advantageously, in this way a controlling of the link valve, in particular a connection to the exit of the link valve, is achievable, depending on the pressures applied to the two sides from an outside. In particular, the sides of the valve slide are hydraulically separate from each other when the valve slide sits on the valve seat in a sealing manner. In particular, there is always one of the control ports arranged on a pressure side of the valve slide, while the other one of the control ports is arranged on a pressure-free side of the valve slide. In particular, the opening point of the shock absorber is the point in which the valve slide is lifted from the valve seat. The valve slide is configured to generate, depending on its opening position, a damping of an applied tensile or compressive force. If an acting tensile or compressive force is large enough to lift the valve slide from the valve seat, a pressure fluid will flow between the two sides, as a result of which a damping of the acting tensile or compressive forces will be generated. The control valve is configured to adjust, for example by means of magnetic fields, the damping force/damping hardness by influencing the opening movement of the valve slide. The valve slide is connected to a magnet armature of an electromagnet. The electromagnet is configured to generate a force opposed to an opening movement of the valve slide. "Configured" is in particular to mean specially programmed, designed and/or equipped. In particular, the sealing surface is arranged on a side of the valve slide facing away from the electromagnet, wherein a reverse implementation is generally also conceivable. By an object being configured for a specific function is in particular to be understood that the object fulfils and/or carries out this specific function in at least one application state and/or operation state.

In addition, it is proposed that the exit, which is preferably different from the control ports, is hydraulically connected to a third side of the valve slide, which is arranged opposite the sealing surface as viewed in a designated movement direction of the valve slide. In this way, advantageous damping properties are achievable. Advantageously, a regulatable (at least section-wise axial) flow-through of the valve slide is attainable. In particular, the exit, which is different from the control ports, is open to a side of the valve slide that is arranged opposite the sealing surface in the axial direction of the valve slide. In particular, the exit is connected either to a hydraulic effective surface, in particular a hydraulic effective surface differing from the hydraulic effective surfaces onto which chassis vibrations are exerted, or to the pressure fluid reservoir.

If the hydraulic link valve is realized as a two-pressure valve, which is in particular configured to open and/or keep open the entry to which the control port having the lower pressure is assigned, in particular the control port of the two control ports at which a lower pressure is applied, towards the exit, which is in particular different from the control ports, preferably the exit of the two-pressure valve, advantageous damping properties are achievable. Advantageously, a selective regulation of the flow-through of the valve slide is achievable. Advantageously, in this way an exchange, which is as resistance-free as possible, is enabled between the pressure fluid reservoir of the control valve and the pressure-free (pressure fluid) tank of the shock absorber. Advantageously, leakage can be kept low while enabling high-grade dynamics. The valve slide in particular comprises at least one flow channel with at least one branching, wherein preferably each branch path forms respectively one of the four flow-through paths. At the branching, a first sub-channel of the flow channel, a second sub-channel of the flow channel and a third sub-channel of the flow channel meet. Preferably the first sub-channel of the flow channel and the second sub-channel of the flow channel together form the first flow-through path of the valve slide. Preferably the first sub-channel of the flow channel and the third sub-channel of the flow channel together form the second flow-through path of the valve slide. The two-pressure valve is in particular arranged in the branching of the flow channel and is configured to open and/or keep open the first sub-channel towards that one of the two further sub-channels at which a lower pressure is applied. Preferably, the two-pressure valve at the same time closes the first sub-channel towards that one of the two further sub-channels that has the higher pressure.

Furthermore, it is proposed that the exit of the two-pressure valve is hydraulically connected to a region of the valve slide which at least partially delimits the pressure fluid reservoir of the control valve, wherein the pressure fluid reservoir is in particular configured to be filled and/or emptied during a movement of the valve slide via a flow-through path that is controlled at least by the two-pressure valve. In this way, advantageous damping properties are achievable. Advantageously, a selective regulation of the flow-through of the valve slide is achievable. Advantageously, in this way an exchange, which is as resistance-free as possible, is enabled between the pressure fluid reservoir of the control valve and the pressure-free (pressure fluid) tank of the shock absorber. In particular, the two-pressure valve ensures that the flow-through path always opens into the currently pressure-free (pressure fluid) tank and thus the filling and emptying of the pressure fluid reservoir during a movement of the valve slide proceeds at least substantially in a resistance-free manner.

If the hydraulic link valve is realized as a shuttle valve, which is in particular configured to open and/or keep open the entry to which the control port having the higher pressure is assigned, in particular to open and/or keep open that control port of the two control ports at which a higher pressure is applied, towards the exit, which is in particular different from the control ports, preferably the exit of the shuttle valve, advantageous damping properties are achievable. Advantageously, a selective regulation of the flow-through of the valve slide is achievable. Advantageously, in this way a transmission of forces, in particular shock absorber tensile forces and/or shock absorber compressive forces, which is as efficient and/or dynamic as possible, is enabled to the hydraulic effective surface of the valve slide, which is configured to generate a counterforce to the forces. In particular, the hydraulic effective surface is larger than the further hydraulic effective surface(s), in particular independently of whether further connectable hydraulic effective sub-surfaces are connected to the hydraulic effective surface or not. The valve slide in particular comprises at least one further flow channel with at least one branching, wherein preferably each branch path forms respectively one of the four flow-through paths. At the branching, a first sub-channel of the further flow channel, a second sub-channel of the further flow channel and a third sub-channel of the further flow channel meet. Preferably the first sub-channel of the further flow channel and the second sub-channel of the further flow channel together form the third flow-through path of the valve slide. Preferably the first sub-channel of the further flow channel and the third sub-channel of the further flow channel together form the fourth flow-through path of the valve slide. The shuttle valve is in particular arranged in the branching of the further flow channel and is configured to open and/or keep open the first sub-channel towards that one of the two further sub-channels at which a higher pressure is applied. Preferably the two-pressure valve at the same time closes the first sub-channel towards that one of the two further sub-channels that has the lower pressure. The shuttle valve is in particular configured to hydraulically separate the respectively currently pressure-free side from the first sub-channel of the further flow channel. The shuttle valve in particular ensures that a flow-through path of the exit of the further flow channel always opens into the currently pressure-loaded tank and thus the pressure also acts on the (upper) hydraulic effective surface, which is in particular configured to generate a counterforce to the shock absorber tensile forces and/or shock absorber compressive forces.

In the following, it is proposed that the exit of the shuttle valve is hydraulically connected to a hydraulic effective surface, in particular of the valve slide, which is situated opposite a further hydraulic effective surface, in particular of the valve slide, which is realized on the side of the valve slide towards which the shuttle valve, in particular the control port of the shuttle valve, is currently open. In this way, advantageous damping properties are achievable. Advantageously, in this way a transmission of forces, in particular shock absorber tensile forces and/or shock absorber compressive forces, which is as efficient and/or dynamic as possible, is enabled to the hydraulic effective surface of the valve slide, which is configured to generate a counterforce to said forces.

Beyond this, it is proposed that the opposite-situated hydraulic effective surfaces have different dimensions. In this way, advantageous damping properties are achievable. Advantageously, a pressure-dependent force difference between the opposite-situated sides of the valve slide is achievable. In particular, the hydraulic effective surface is larger than each of the further hydraulic effective surfaces. In particular, the hydraulic effective surface, preferably a totality of all hydraulic effective sub-surfaces of the hydraulic effective surface, is by at least 3%, preferably by at least 5%, advantageously by at least 10%, preferably by at least 15% and preferentially by at most 25% larger than the respective opposite-situated further hydraulic effective surface on the pressure side or tension side.

In addition, it is proposed that the flow-through hydraulic valve slide comprises at least one further hydraulic link valve, which in particular differs from the hydraulic link valve in a functional principle, for influencing a flow-through of the valve slide, wherein the further hydraulic link valve comprises at least one first control port and at least one second control port and in particular has at least one exit, which can be opened in an interchangeable manner towards at least one of the control ports. In this way, advantageous damping properties are achievable. As a result, advantageous flow-through properties of the valve slide are achievable for the damping. In particular, the hydraulic link valve and the further hydraulic link valve have different exits, which are in particular realized separately from each other and/or are sealed with respect to one another.

If herein the hydraulic link valve is realized as a two-pressure valve and the further hydraulic link valve is realized as a shuttle valve, high dynamics can advantageously be achieved with at the same time low leakage. In particular, the two-pressure valve and the shuttle valve are respectively enclosed by the valve slide. In particular, the two-pressure valve and the shuttle valve are realized separately from each other. In particular, the respective movement axes of the valve elements of the two-pressure valve and the shuttle valve extend in directions which are not parallel to each other.

If herein moreover the hydraulic link valve is assigned to the flow channel (one of the exits) realized at least partially by the valve slide and the further hydraulic link valve is assigned to the further flow channel (other of the exits) realized at least partially by the valve slide, wherein the two flow channels are realized completely separate from each other, in particular without connection to each other, it is advantageously possible to achieve high dynamics and at the same time low leakage.

Alternatively, it is proposed that the hydraulic link valve is realized as a single valve, which has at least one further exit and which combines the function of a shuttle valve with the function of a two-pressure valve in one valve. This advantageously allows further reducing complexity, in particular by further reduction of a number of components. Advantageously, costs can be kept low as a result. In particular, in such a case the valve slide is free of further valves, such as further shuttle valves or further two-pressure valves. In particular, the single valve is arranged at the same time in the first flow channel and in the second flow channel of the valve slide.

It is further proposed that the single valve is embodied as a 4/2 shuttle valve, which is configured to open and/or keep open the entry assigned to that control port of the two control ports at which, in particular viewed relatively, a higher pressure is applied, towards the exit, in particular towards the exit of the link valve which is hydraulically connected to the hydraulic effective surface, and at the same time to open and/or keep open the entry assigned to that control port of the two control ports at which, in particular viewed relatively, a lower pressure is applied, towards the further exit, in particular towards the exit of the link valve which is hydraulically connected to the pressure fluid reservoir. In this way, the functions of a shuttle valve and of a two-pressure valve can advantageously be combined in a single valve. In this way, complexity and costs are advantageously reducible.

Furthermore, it is proposed that the hydraulic link valve that is embodied as a 4/2 shuttle valve comprises a combination-valve valve slide which is at least section-wise capable of being flowed through. In this way, high compactness is advantageously achievable. Moreover, an advantageous valve configuration is achievable, which is in particular suitable for combining the functions of a two-pressure valve and a shuttle valve in a single valve. In particular, the combination-valve valve slide comprises an, in particular internal, flow channel which extends at least over a large portion of a longitudinal extent of the combination-valve valve slide.

It is also proposed that, in particular apart from the hydraulic link valve and/or apart from the further hydraulic link valve, the flow-through hydraulic valve slide has an orifice-free configuration. This advantageously allows keeping a complexity and in particular a number of components at a low level. An "orifice" is in particular to mean a local flow resistance element with a step-like cross-section constriction, in which a ratio of length to diameter is comparably small, preferably smaller than 1.5.

Furthermore, a—preferably proportional—bidirectional control valve is proposed for regulating damping characteristics, in particular of shock absorbers, with the flow-through hydraulic valve slide. This allows providing advantageous damping properties and/or damping characteristics. In particular, the bidirectional control valve is configured for a regulation of the damping characteristics in two directions, preferably in a rebound direction and in a compression direction. A "proportional bidirectional control valve" is in particular to mean a bidirectional control valve configured for regulating a damping force, preferably of a shock absorber, in a current-proportional manner. In particular, the bidirectional control valve is configured, with a bidirectional flow-through, to always conduct a compensation of a fluid volume into a space having a lower pressure, while at the same time the compensation of the fluid volume with a space having a higher pressure is blocked. In a customary implementation with orifices, this would result in that, in contrast to a unidirectional control valve, a double number of orifices requiring installation space would be necessary. The implementation according to the invention thus allows keeping installation space, number of components and thus costs at a low level.

It is moreover proposed that the bidirectional control valve is specifically implemented for achieving a capability for regulating a pressure drop at the valve slide, starting from a volume flow of less than 10 l/min, preferably less than 5 l/min and preferably less than 2 l/min. In this way, advantageous damping properties/damping characteristics are achievable. In particular, an opening point/inflection point of the bidirectional control valve is below 10 l/min, preferably below 5 l/min and preferentially below 2 l/min.

Furthermore, it is proposed that the bidirectional control valve comprises a first tank, in particular for a shock absorber rebound stage, and a second tank that is separable from the first tank by the valve slide, in particular for a shock absorber compression stage, the bidirectional control valve further comprising a pressure fluid reservoir the volume of which is variable by a movement of the valve slide, which is realized separately from the tanks and which is partially fillable and/or partially emptyable by a flow-through of the valve slide, wherein the hydraulic link valve that is realized as a two-pressure valve is configured to automatically and dynamically create a valve-slide flow-through connection between the pressure fluid reservoir and only that one of the two tanks which currently has a lower pressure load, in particular which is currently pressure-free. In this way, advantageous damping properties/damping characteristics are achievable, which preferably permit high dynamics with low leakages. In particular, the first tank is realized as a first chamber of a piston rod of a shock absorber. In particular, the second tank is realized as a second chamber of the piston rod of the shock absorber.

In addition, a vehicle with the bidirectional control valve is proposed, which has an advantageously comfortable chassis.

Furthermore, a method for an automatic adjustment of instantaneous flow-through directions by means of flow-through valve slides is proposed, wherein the instantaneous flow-through directions are automatically adjusted dynamically by the two-pressure valve, which is in particular at least partially integrated in the valve slide, and by the shuttle valve, which is in particular at least partially integrated in the valve slide, or by the 4/2 shuttle valve, which is in particular at least partially integrated in the valve slide. In this way, advantageous damping properties are achievable. Advantageously, a damping characteristic for shock absorbers is achievable which at the same time has high dynamics and low overall leakage.

The valve slide according to the invention, the control valve according to the invention, the vehicle according to the invention and the method according to the invention shall not be limited to the above-described application and implementation. In particular, in order to fulfil a functionality that is described here, the valve slide according to the invention, the control valve according to the invention, the vehicle according to the invention and the method according to the invention may have a number of individual elements, components, method steps and units that differs from a number given here.

DRAWINGS

Further advantages will become apparent from the following description of the drawings. Two exemplary embodiments of the invention are illustrated in the drawings. The drawings, the description and the claims contain a plurality of features in combination. Someone skilled in the art will purposefully also consider the features individually and will find further expedient combinations.

Figure 2:
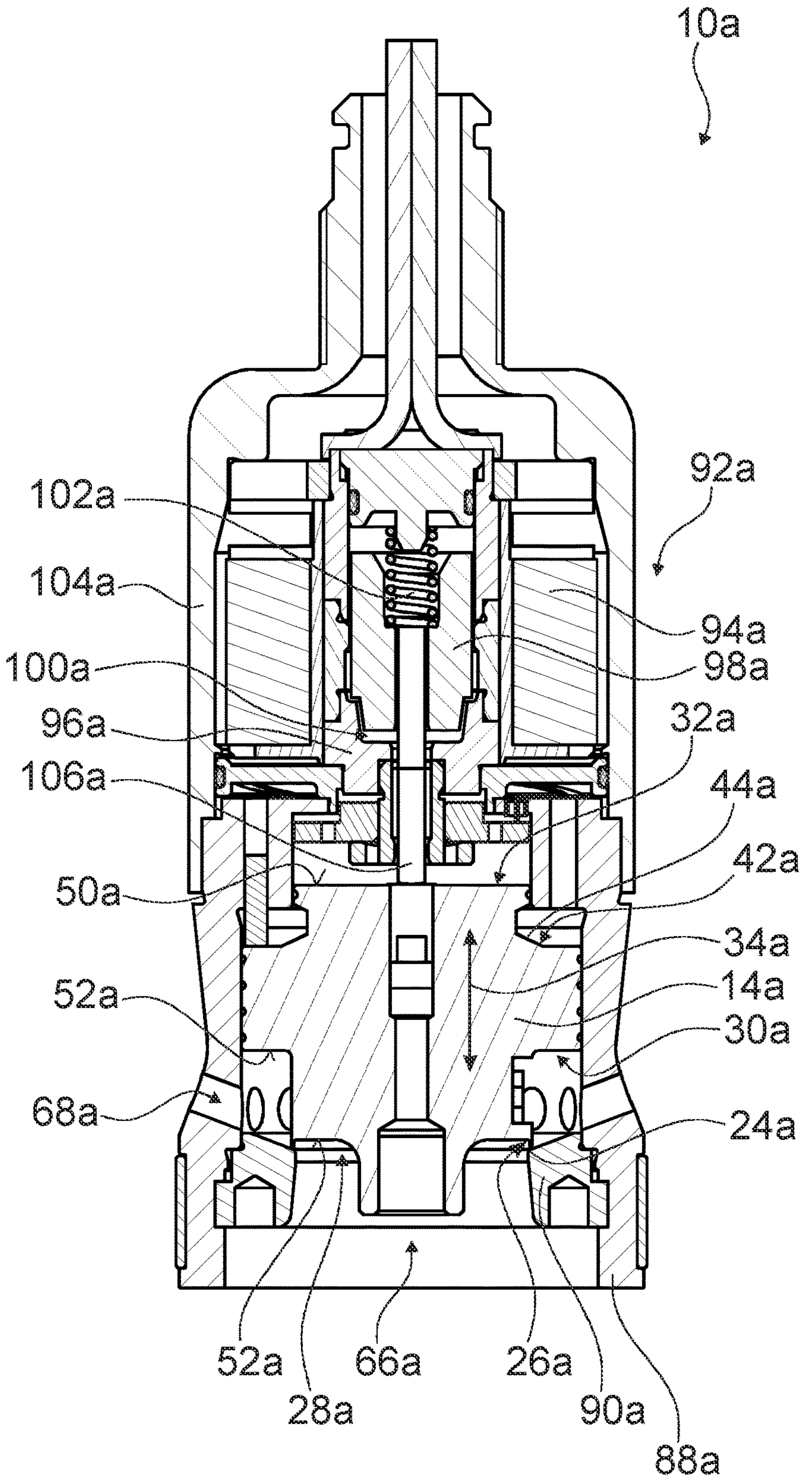
Figure 3:
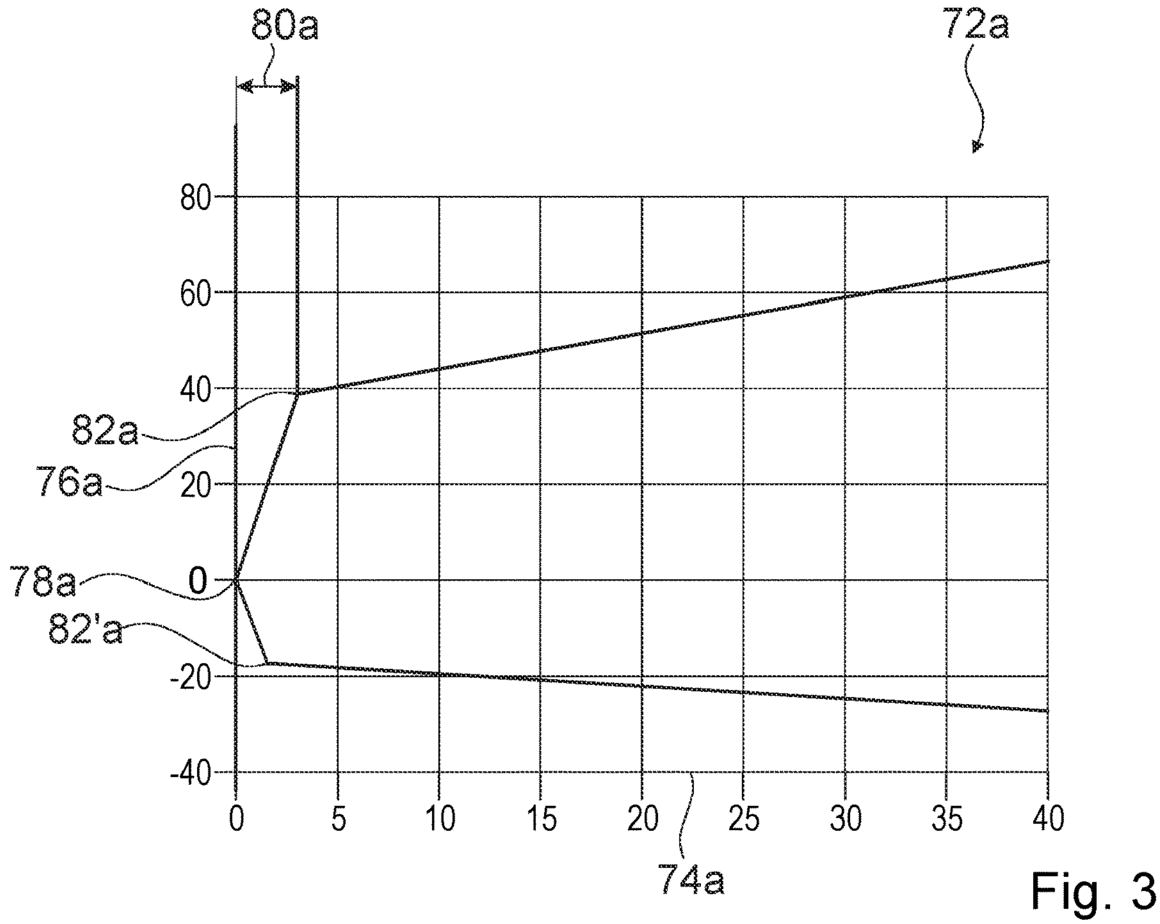
Figure 4:
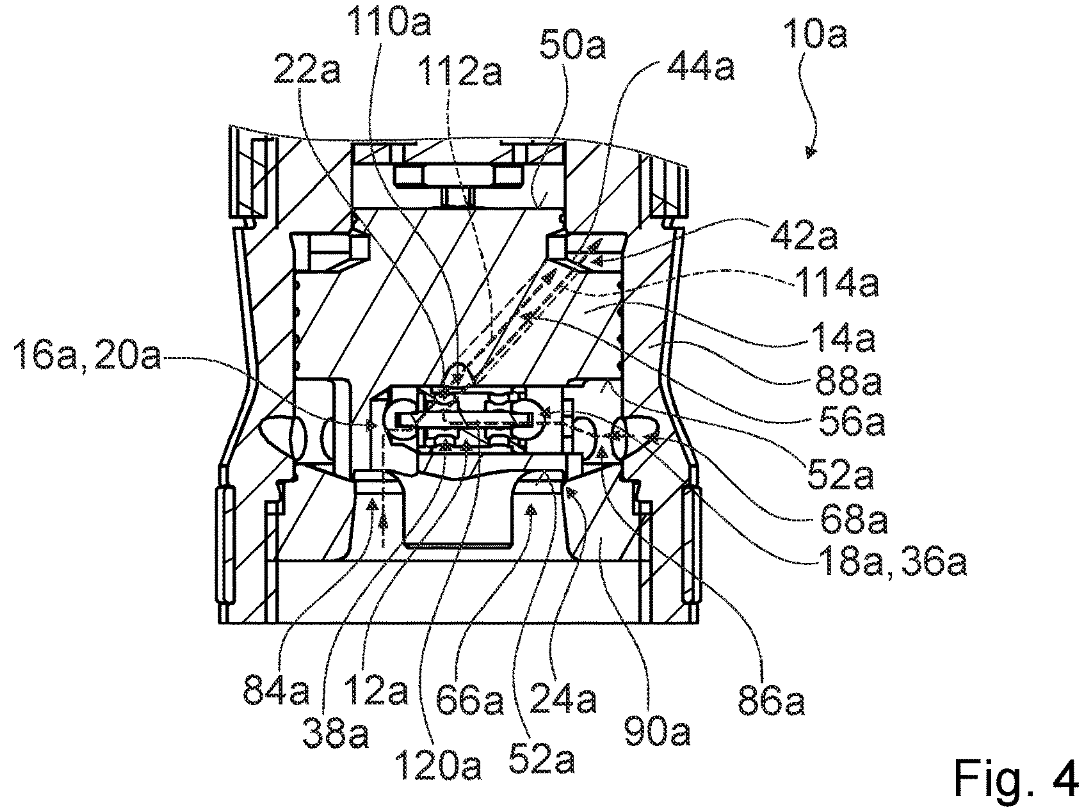
Figure 5:
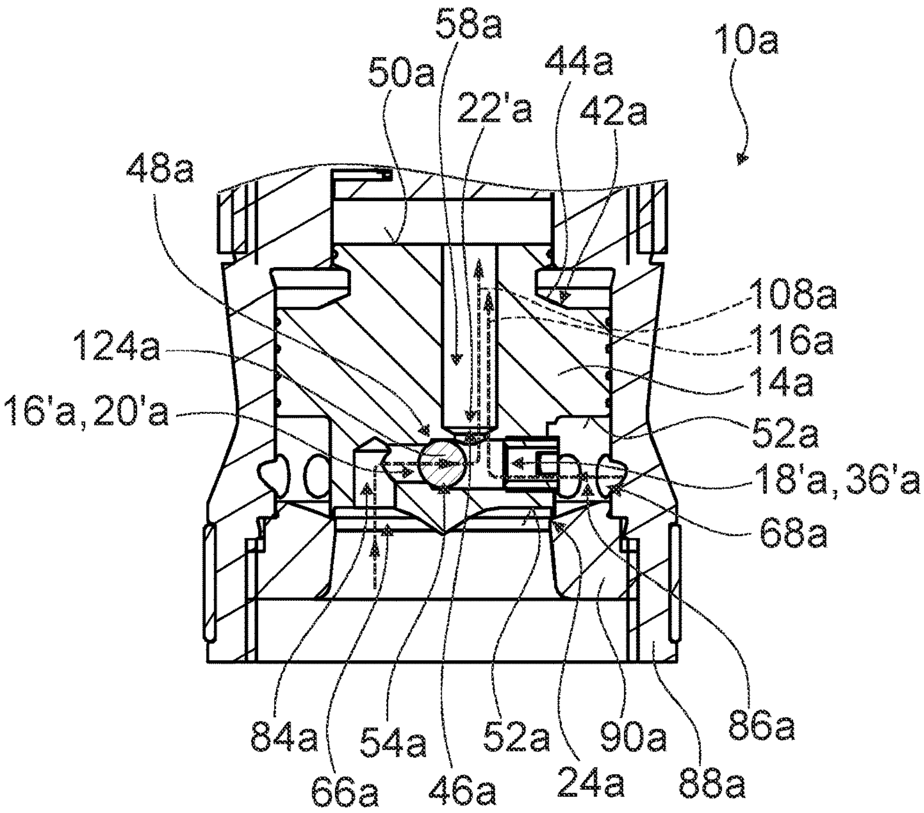
Figure 6:
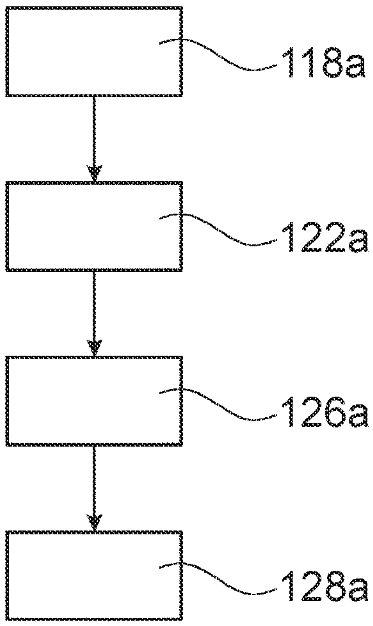
Figure 7A:
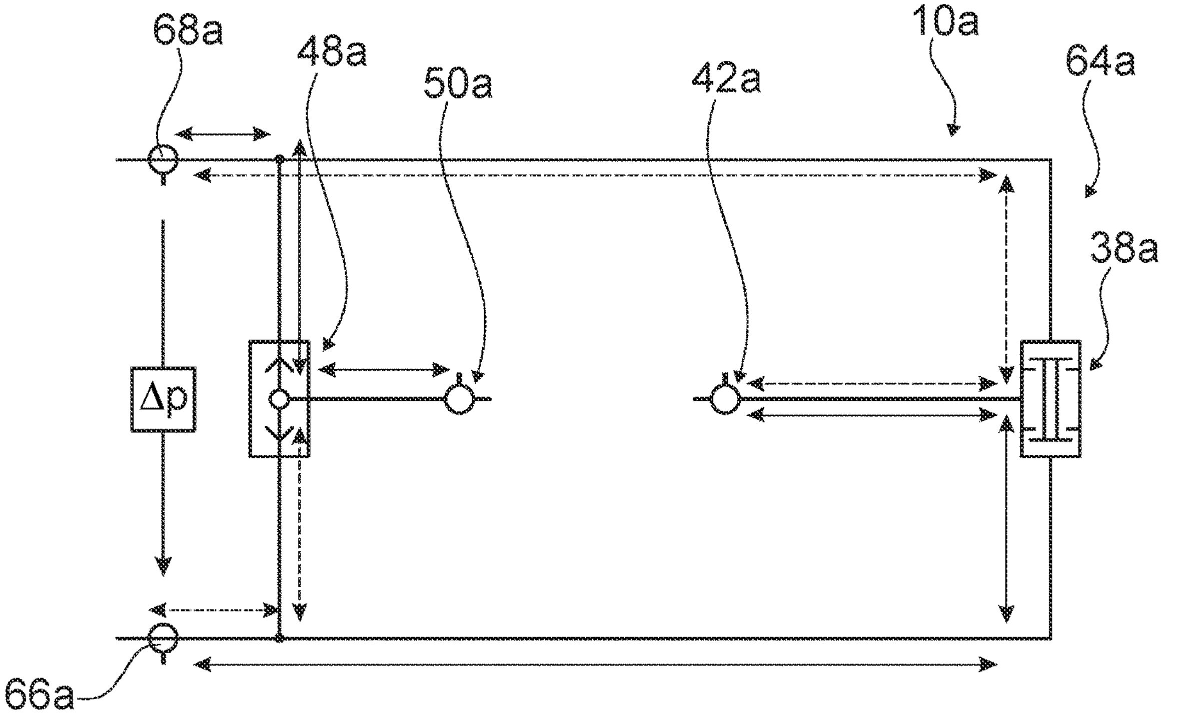
Figure 7B:
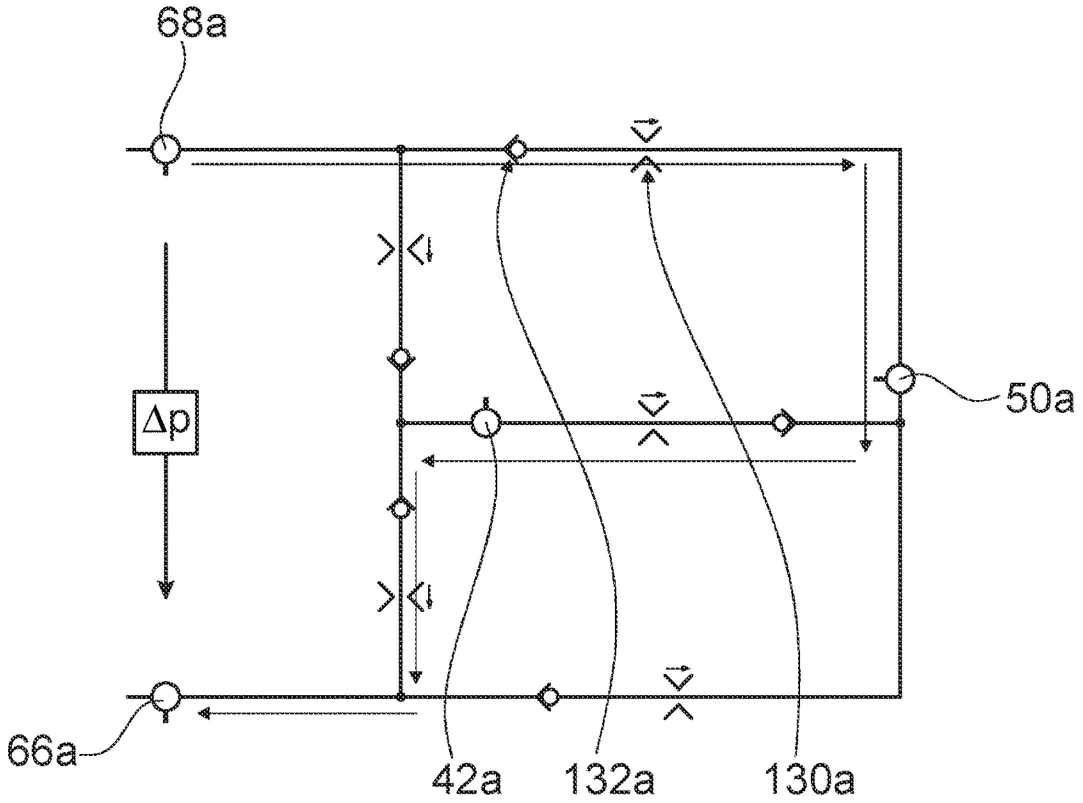
Figure 8:
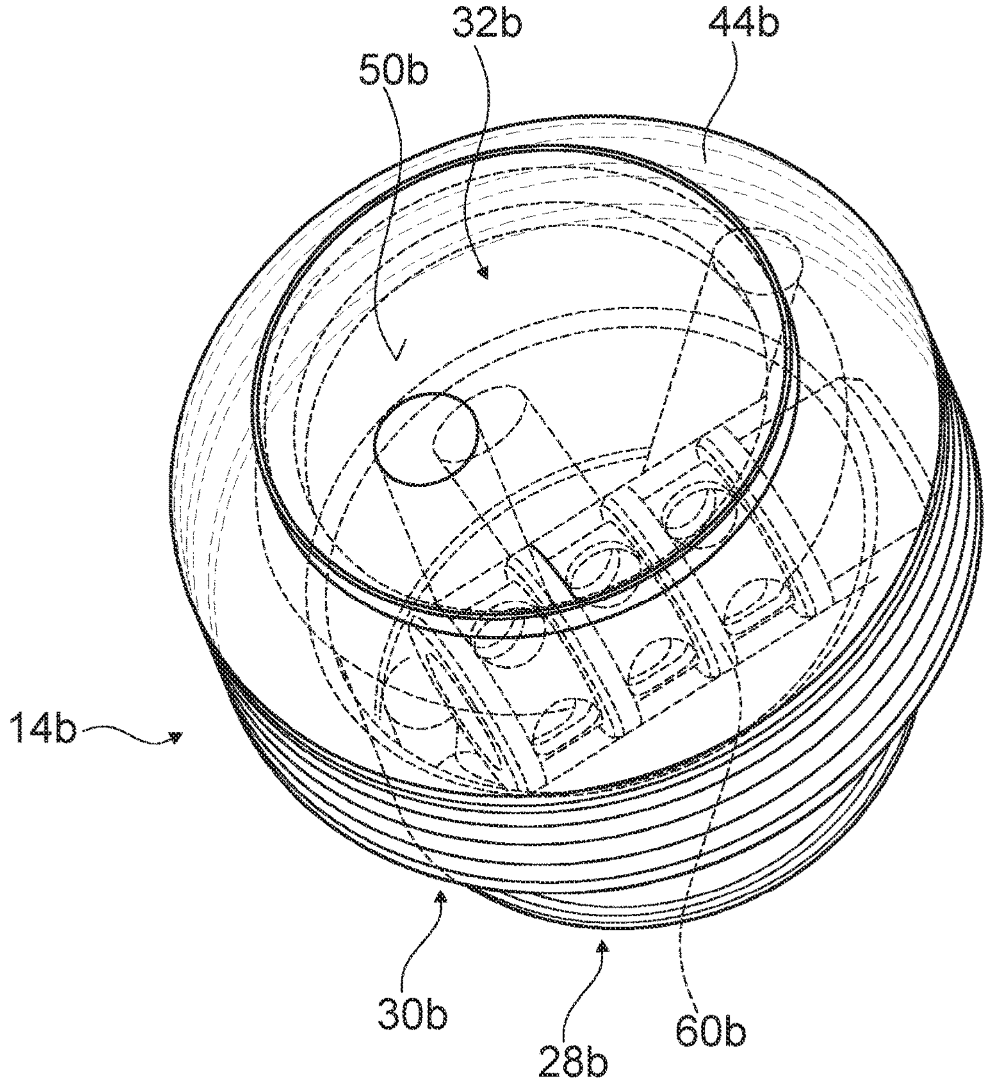
Figure 9:
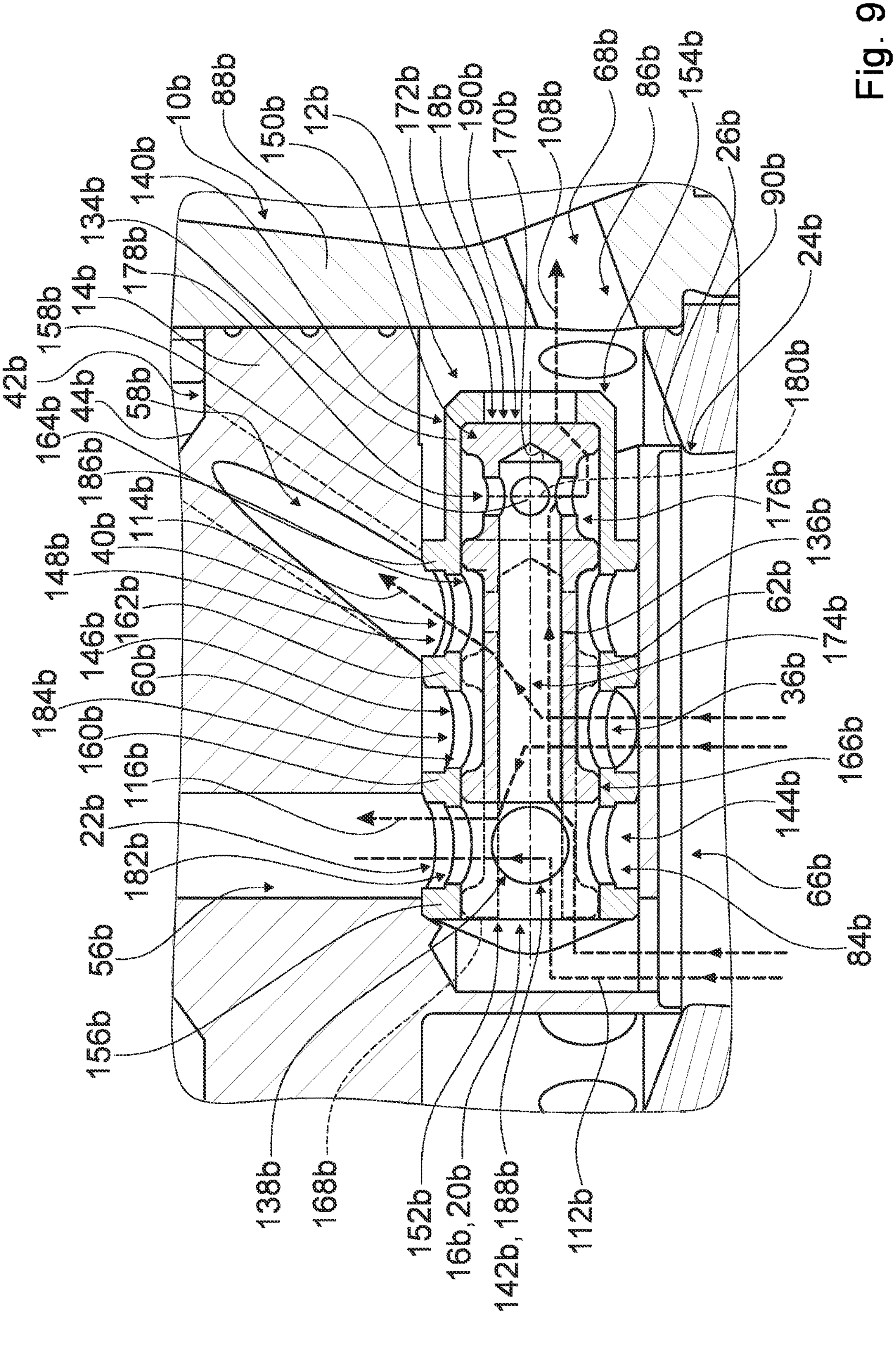

In the drawings:

FIG. 1 shows a schematic illustration of a vehicle with a bidirectional control valve, FIG. 2 shows a schematic section, taken in a first sectional plane, through the control valve with a flow-through hydraulic valve slide, FIG. 3 shows a damping characteristic diagram of the control valve, FIG. 4 shows a detail of a further schematic section, taken in a second sectional plane that is different from the first sectional plane, through the control valve with the valve slide, FIG. 5 shows a detail of a further schematic section, taken in a third sectional plane that is different from the first sectional plane and the second sectional plane, through the control valve with the valve slide, FIG. 6 shows a schematic flow chart of a method for an automatic adjustment of instantaneous flow-through directions by means of the valve slide of the control valve, FIG. 7*a* shows a schematic hydraulic circuit diagram of the control valve according to the invention, FIG. 7*b* shows a schematic hydraulic circuit diagram of a control valve known from the prior art, FIG. 8 schematically shows a perspective view of an alternative flow-through hydraulic valve slide for an alternative bidirectional control valve, and FIG. 9 shows a schematic section through a portion of the alternative control valve with the alternative valve slide.

DESCRIPTION OF THE EXEMPLARY EMBODIMENTS

FIG. 1 schematically shows a vehicle 70*a* with a bidirectional control valve 10*a*. The vehicle 70*a* is designed as a passenger car. Alternative vehicles having chassis, such as other road vehicles, agricultural vehicles, rail vehicles, aircraft etc., are also conceivable. The bidirectional control valve 10*a* is configured for regulating damping characteristics, in particular of shock absorbers (not shown) of the vehicle 70*a*. By means of the bidirectional control valve 10*a* according to the invention, a capability for regulating a pressure drop at a valve slide 14*a* of the bidirectional control valve 10*a* can be achieved, starting from a volume flow of less than 10 l/min, preferably less than 5 l/min and preferentially less than 2 l/min.

FIG. 2 shows a schematic section, taken in a first sectional plane, through the control valve 10*a*. The control valve 10*a* comprises the valve slide 14*a*. The valve slide 14*a* is implemented in such a way that it can be flowed through. The valve slide 14*a* can be flowed through by a pressure fluid of a hydraulic system. The control valve 10*a* comprises a first pressure port 84*a* (cf. FIG. 4). The control valve 10*a* comprises a first tank 66*a*. The first tank 66*a* is fluidically connected to the first pressure port 84*a*. The control valve 10*a* comprises a second pressure port 86*a* (cf. FIG. 4). The control valve 10*a* comprises a second tank 68*a*. The second tank 68*a* is separable from the first tank 66*a* in a fluid-tight manner. The tanks 66*a*, 68*a* are separable from each other by the valve slide 14*a*. The second tank 68*a* is fluidically connected to the second pressure port 86*a*. The tensile forces and compressive forces that are to be damped by the shock absorber act on the pressure ports 84*a*, 86*a*. For example, shock absorber compressive forces generate a pressure acting on the valve slide 14*a* at the first pressure port 84*a*, and shock absorber tensile forces generate a pressure acting on the valve slide 14*a* at the second pressure port 86*a*. If shock absorber compressive forces act on the valve slide 14*a*, the second pressure port 86*a* implements a pressure-free side of the control valve 10*a*. If shock absorber tensile forces act on the valve slide 14*a*, the first pressure port 84*a* implements a pressure-free side of the control valve 10*a*. If the pressure applied at the valve slide 14*a* exceeds a limit value (opening pressure), the valve slide 14*a* opens a connection between the two pressure ports 84*a*, 86*a*. The pressure ports 84*a*, 86*a* are realized as openings in a valve housing 88*a* of the control valve 10*a*. The valve slide 14*a* is herein arranged completely within the valve housing 88*a*. The valve housing 88*a* of the control valve 10*a*, in particular a valve seat element 90*a* that is connected to the valve housing 88*a*, forms a valve seat 24*a*. The valve slide 14*a* is configured to sit on the valve seat 24*a* in a sealing manner. In a movement of the valve slide 14*a* along a designated movement direction 34*a* of the valve slide 14*a*, the valve seat 24*a* opens and closes. The valve slide 14*a* is configured to generate, depending on its opening position, a damping of the tensile forces or compressive forces applied at the control valve 10*a*. If an engaging tensile or compressive force is large enough to lift the valve slide 14*a* from the valve seat 24*a*, a pressure fluid will flow between the pressure ports 84*a*, 86*a*, as a result of which a damping of the engaging tensile or compressive forces will be generated. By an adjustment of a force with which the valve slide 14*a* is pressed onto the valve seat 24*a*, a damping hardness of the control valve 10*a*, in particular of the chassis damper, can be adjusted. If the valve slide 14*a* is pressed strongly onto the valve seat 24*a*, the damping characteristic is hard. If the valve slide 14*a* is pressed less strongly onto the valve seat 24*a*, the damping characteristic is soft. The valve slide 14*a* comprises a sealing surface 26*a*. The sealing surface 26*a* is configured for a (fluid-)tight sitting of the valve slide 14*a* on the valve seat 24*a* of the control valve 10*a*.

The control valve 10*a* comprises an electromagnet 92*a*. The electromagnet 92*a* comprises a magnet coil 94*a*. The electromagnet 92*a* is configured to adjust a force required for lifting the valve slide 14*a* from the valve seat 24*a*. Depending on a magnetic field strength generated by the magnet coil 94*a*, the force required for lifting the valve slide 14*a* from the valve seat 24*a* increases. The electromagnet 92*a* is realized as a reluctance magnet. The electromagnet 92*a* comprises a magnetic core 96*a*. The magnetic core 96*a* is to a large portion arranged in an interior of the magnet coil 94*a*. The magnetic core 96*a* protrudes from the interior of the magnet coil 94*a* towards the valve slide 14*a*. The control valve 10*a* comprises a main armature 98*a*. The main armature 98*a* is realized as a magnet armature comprising a ferromagnetic material. The main armature 98*a* is arranged in the interior of the magnet coil 94*a*. The main armature 98*a* is movably supported in the interior of the magnet coil 94*a*. An air gap 100*a* of the electromagnet 92*a* that is realized as a reluctance magnet is arranged between the main armature 98*a* and the magnetic core 96*a*. The main armature 98*a* is pulled towards the magnetic core 96*a* and/or held in a position close to the magnetic core 96*a* by the magnetic field of the magnet coil 94*a*. On a side opposite the magnetic core 96*a*, the main armature 98*a* is supported on an upper side of the control valve 10*a* by a compression spring 102*a*. The electromagnet 92*a* comprises a magnet housing 104*a* that surrounds the magnet coil 94*a*. The valve housing 88*a* and the magnet housing 104*a* are sealingly connected to each other. The control valve 10*a*, in particular the electromagnet 92*a*, comprises a tappet element 106*a*. The tappet element 106*a* is fixedly connected to the main armature 98*a* or is supported on the main armature 98*a*. The tappet element 106*a* is configured to transmit a force generated by the main armature 98*a* to the valve slide 14*a*. The tappet element 106*a* protrudes from the interior of the magnet coil 94*a* towards the valve slide 14*a*. The tappet element 106*a* can be operated by the magnet coil 94*a*. The tappet element 106*a* is configured to adjust, in an energized (normal) operation state, a variable damping characteristic of the control valve 10*a* depending on the magnetic field strength generated by the magnet coil 94*a*. The control valve 10*a* comprises a pressure fluid reservoir 42*a*. The pressure fluid reservoir 42*a* is variable with respect to its volume by a movement of the valve slide 14*a*. The pressure fluid reservoir 42*a* is partially fillable and partially emptyable by the flow-through of the valve slide 14*a* with the pressure fluid (for example oil). The pressure fluid reservoir 42*a* is realized separately from the tanks 66*a*, 68*a*. Furthermore, with regard to the implementation and functionality of the control valve 10*a*, reference is made to the German patent application with the application number 10 2021 134 565.0, the content of which is herewith entirely incorporated into the present patent application.

FIG. 3 shows by way of example a damping characteristic diagram 72*a* of the control valve 10*a* according to the invention with the valve slide 14*a* according to the invention, in which a damper speed (in l/min) is plotted on an abscissa 74*a* and in which a damper force/a pressure (in bar) is plotted on an ordinate 76*a*. Herein positive damper forces correspond to compressive forces and negative damper forces correspond to tensile forces. A narrow region of strong slope, starting from a zero point 78*a* of the damping characteristic diagram 72*a*, indicates a respective leakage 80*a* of the control valve 10*a* in the rebound direction and in the pressure direction. The points in which the slopes decrease are referred to as opening points 82*a*, 82'*a* of the control valve 10*a* and indicate when the valve slide 14*a*—and not leakages of the valve slide 14*a* or other components—starts determining the damping characteristic. The strength of the damper force (i.e. the "height" of the solid line) is adjustable by a regulation of the magnetic field strength of the electromagnet 92*a*. The solid lines indicate a damping characteristic in the energized (normal) operation state for a specific magnetic field.

FIG. 4 shows a detail of a further schematic section, taken in a second sectional plane that is different from the first sectional plane, through the control valve 10*a*. The valve slide 14*a* can be flowed through. The valve slide 14*a* is configured as a flow-through hydraulic valve slide 14*a*. The valve slide 14*a* comprises a hydraulic link valve 12*a*. The hydraulic link valve 12*a* is integrated in the valve slide 14*a*. The hydraulic link valve 12*a* shown in FIG. 4 is realized as a two-pressure valve 38*a*. The two-pressure valve 38*a* comprises a valve slide 120*a*, which is configured to adjust the opening position of the two-pressure valve 38*a*. The hydraulic link valve 12*a* is configured for an influencing of the flow-through of the valve slide 14*a*. The hydraulic link valve 12*a* comprises a first control port 16*a*. The hydraulic link valve 12*a* comprises a first entry 20*a*. In the case shown in FIG. 4, the first control port 16*a* and the first entry 20*a* coincide (in one element). The hydraulic link valve 12*a* comprises a second control port 18*a*. The hydraulic link valve 12*a* comprises a second entry 36*a*. In the case shown in FIG. 4, the second control port 18*a* and the second entry 36*a* coincide (in one element). The hydraulic link valve 12*a* comprises an exit 22*a* (here: exactly one exit 22*a*). The exit 22*a* is arranged separately from the control ports 16*a*, 18*a*. Depending on a position of the hydraulic link valve 12*a*, the exit 22*a* can be opened in an interchangeable manner towards one of the entries 20*a*, 36*a*. The two-pressure valve 38*a* is configured to automatically and dynamically create a valve-slide flow-through connection between the pressure fluid reservoir 42*a* and only that one of the two tanks 66*a*, 68*a* which currently has a lower pressure load, in particular which is currently pressure-free.

The first control port 16*a* is hydraulically connected to a first side 28*a* of the valve slide 14*a*. The second control port 18*a* is hydraulically connected to a second side 30*a* of the valve slide 14*a*. The two sides 28*a*, 30*a* which the control ports 16*a*, 18*a* are hydraulically connected to are arranged relative to the valve slide 14*a*/on the valve slide 14*a* in such a way that the first side 28*a* and the second side 30*a* can be sealed (in a fluid-tight manner) against each other by the sealing surface 26*a* of the valve slide 14*a*. The exit 22*a* of the hydraulic link valve 12*a* of FIG. 4 is hydraulically connected to a third side 32*a* of the valve slide 14*a*. Viewed in the designated movement direction 34*a* of the valve slide 14*a*, the third side 32*a* of the valve slide 14*a* is arranged opposite the sealing surface 26*a* of the valve slide 14*a*.

The two-pressure valve 38*a* is configured to open and/or keep open the entry 20*a*, 36*a*, to which the control port 16*a*, 18*a* having the lower pressure is assigned, towards the exit 22*a*. The valve slide 14*a* comprises a flow channel 56*a*. The flow channel 56*a* is configured as a recess in the valve slide 14*a*. The hydraulic link valve 12*a* (the two-pressure valve 38*a*) is assigned to the flow channel 56*a*. The flow channel 56*a* comprises three partial flow channels: one partial flow channel connected to the first entry 20*a* of the hydraulic link valve 12*a*, one partial flow channel connected to the second entry 36*a* of the hydraulic link valve 12*a* and one partial flow channel connected to the exit 22*a* of the hydraulic link valve 12*a*. The partial flow channels of the flow channel 56*a* may be realized as bores in the valve slide 14*a*. The flow channel 56*a* has a branching 110*a*. In the branching 110*a*, three sub-channels of the flow channel 56*a* meet, which respectively open into one of the aforementioned partial flow channels. The flow channel 56*a* comprises a first flow-through path 112*a*. The first flow-through path 112*a* extends via the branching 110*a* between the partial flow channel connected to the first entry 20*a* of the hydraulic link valve 12*a* and the partial flow channel connected to the exit 22*a* of the hydraulic link valve 12*a*. The flow channel 56*a* comprises a second flow-through path 114*a*. The second flow-through path 114*a* extends via the branching 110*a* between the partial flow channel connected to the second entry 36*a* of the hydraulic link valve 12*a* and the partial flow channel connected to the exit 22*a* of the hydraulic link valve 12*a*. Both flow-through paths 112*a*, 114*a* of the flow channel 56*a* open into the partial flow channel that is connected to the exit 22*a* of the hydraulic link valve 12*a*. The partial flow channel which starts from the exit 22*a* extends obliquely/at an angle relative to the designated movement direction 34*a* of the valve slide 14*a*.

The exit 22*a* of the two-pressure valve 38*a* is hydraulically connected to a region 44*a* of the valve slide 14*a* that is configured to at least partially delimit the pressure fluid reservoir 42*a* of the control valve 10*a*. The pressure fluid reservoir 42*a* is configured to be filled and/or emptied during a movement of the valve slide 14*a* via one of the flow-through paths 112*a*, 114*a* that is controlled at least by the two-pressure valve 38*a*. The pressure fluid reservoir 42*a* is partially delimited by the valve housing 88*a*. The pressure fluid reservoir 42*a* is realized by an interaction of the valve slide 14*a* and the valve housing 88*a*. In the state of the two-pressure valve 38*a* shown by way of example in FIG. 4, the first flow-through path 112*a* is open and the second flow-through path 114*a* is closed. In this case, the higher pressure thus acts on the second control port 18*a*.

FIG. 5 shows a detail of a further schematic section, taken in a third sectional plane that is different from the first sectional plane and the second sectional plane, through the control valve 10*a*. The valve slide 14*a* comprises a further hydraulic link valve 54*a*. The further hydraulic link valve 54*a* is realized differently from the hydraulic link valve 12*a*. The further hydraulic link valve 54*a* differs from the hydraulic link valve 12*a* in a functional principle. The further hydraulic link valve 54*a* is integrated in the valve slide 14*a*. The further hydraulic link valve 54*a* is realized separately from the hydraulic link valve 12*a*. The further hydraulic link valve 54*a* is also configured for influencing a flow-through of the valve slide 14*a*. The further hydraulic link valve 54*a* shown in FIG. 5 is realized as a shuttle valve 48*a*. The further hydraulic link valve 54*a* comprises a first control port 16'*a*. The further hydraulic link valve 54*a* comprises a first entry 20'*a*. In the case shown in FIG. 5, the first control port 16'a and the first entry 20'*a* coincide (in one element). The further hydraulic link valve 54*a* comprises a second control port 18'*a*. The further hydraulic link valve 54*a* comprises a second entry 36'*a*. In the case shown in FIG. 5, the second control port 18'*a* and the second entry 36'*a* coincide (in one element). The further hydraulic link valve 54*a* comprises an exit 22'*a* (here: exactly one exit). The exit 22'*a* is arranged separately from the control ports 16'*a*, 18'*a*. Depending on a position of the further hydraulic link valve 54*a*, the exit 22'*a* can be opened in an interchangeable manner towards one of the entries 20'*a*, 36'*a*. The shuttle valve 48*a* comprises a valve element 124*a* (here: illustrated as a valve ball), which is configured to adjust the opening position of the shuttle valve 48*a*.

The first control port 16'*a* of the further hydraulic link valve 54*a* is hydraulically connected to the first side 28*a* of the valve slide 14*a*. The second control port 18'*a* of the further hydraulic link valve 54*a* is hydraulically connected to the second side 30*a* of the valve slide 14*a*. The two sides 28*a*, 30*a*, to which the control ports 16'*a*, 18'*a* of the further hydraulic link valve 54*a* are hydraulically connected, are arranged relative to the valve slide 14*a*/on the valve slide 14*a* in such a way that the first side 28*a* and the second side 30*a* can be sealed (in a fluid-tight manner) against each other by the sealing surface 26*a* of the valve slide 14*a*. The exit 22'*a* of the further hydraulic link valve 54*a* of FIG. 4 is hydraulically connected to the third side 32*a* of the valve slide 14*a*. The exit 22'*a* of the shuttle valve 48*a* is hydraulically connected to a hydraulic effective surface 50*a* of the valve slide 14*a* situated opposite a further hydraulic effective surface 52*a* of the valve slide 14*a*, which is realized on that side 28*a*, 30*a* of the valve slide 14*a* towards which the shuttle valve 48*a* is currently open. The opposite-situated hydraulic effective surfaces 50*a*, 52*a* have different dimensions (for further explanations see also the disclosure of the German patent application filed with the application number 10 2021 134 565.0). The exit 22'*a* of the shuttle valve 48*a* is realized and arranged differently and separately from the exit 22*a* of the two-pressure valve 38*a*. The entries 20'*a*, 36'*a* of the shuttle valve 48*a* are in each case realized and arranged differently and separately from the entries 20*a*, 36*a* of the two-pressure valve 38*a*.

The shuttle valve 48*a* is configured to open and/or keep open the entry 20'*a*, 36'*a*, to which the control port 16'*a*, 18'*a* having the higher pressure is assigned, towards the exit 22'*a*. The valve slide 14*a* comprises a further flow channel 58*a*. The further flow channel 58*a* is realized as a recess in the valve slide 14*a*. The further hydraulic link valve 54*a* (the shuttle valve 48*a*) is assigned to the further flow channel 58*a*. The two flow channels 56*a*, 58*a* are completely separate from each other. The two flow channels 56*a*, 58*a* are realized without connection to each other. The further flow channel 58*a* comprises three partial flow channels: one partial flow channel connected to the first entry 20'*a* of the further hydraulic link valve 54*a*, one partial flow channel connected to the second entry 36'*a* of the further hydraulic link valve 54*a*, and one partial flow channel connected to the exit 22'*a* of the further hydraulic link valve 54*a*. The further flow channel 58*a* comprises a further branching 46*a*. In the further branching 46*a*, three sub-channels of the further flow channel 58*a* meet, which respectively open into one of the aforementioned partial flow channels. The further flow channel 58*a* comprises a third flow-through path 108*a*. The third flow-through path 108*a* extends via the branching 46*a* between the partial flow channel connected to the first entry 20'*a* of the further hydraulic link valve 54*a* and the partial flow channel connected to the exit 22'*a* of the further hydraulic link valve 54*a*. The further flow channel 58*a* comprises a fourth flow-through path 116*a*. The fourth flow-through path 116*a* extends via the branching 46*a* between the partial flow channel connected to the second entry 36'*a* of the further hydraulic link valve 54*a* and the partial flow channel connected to the exit 22'*a* of the further hydraulic link valve 54*a*. Both flow-through paths 108*a*, 116*a* of the further flow channel 58*a* open into the partial flow channel that is connected to the exit 22'*a* of the further hydraulic link valve 54*a*. The partial flow channel which starts from the exit 22'*a* of the further hydraulic link valve 54*a* extends parallel to the designated movement direction 34*a* of the valve slide 14*a*.

FIG. 6 shows a schematic flow chart of a method for an automatic adjustment of instantaneous flow-through directions by means of the flow-through hydraulic valve slide 14*a* of the control valve 10*a*. In the method, an instantaneous flow-through direction is automatically adjusted dynamically by the two-pressure valve 38*a*, which is at least partially integrated in the valve slide 14*a*, and by the shuttle valve 48*a*, which is at least partially integrated in the valve slide 14*a*. Alternatively, instead of the combination of two-pressure valve 38*a* and shuttle valve 48*a*, it is also possible to use a 4/2 shuttle valve 60*b*, which is at least partially integrated in the valve slide 14*b*, as shown in the following FIGS. 8 and 9. In the following, the behavior of the control valve 10*a* when a pressure to be damped is applied to the second tank 68*a* will be described by way of example and schematically (cf. also FIGS. 4 and 5). In at least one method step 118*a*, the two-pressure valve 38*a* is actuated by the applied pressure in such a way that the valve slide 120*a* of the two-pressure valve 38*a* is pushed by the applied pressure into a position in which the valve slide 120*a* of the two-pressure valve 38*a* opens the first flow-through path 112*a* and closes the second flow-through path 114*a*. In this way a fluidic connection of the currently pressure-free first tank 66*a* to the pressure fluid reservoir 42*a* is created. The pressure fluid reservoir 42*a* could thus be filled or emptied in a resistance-free manner during a movement of the valve slide 14*a* (if, for example, the applied pressure exceeds the limit value of the opening point 82*a*). In at least one further method step 122*a*, the valve element 124*a* of the shuttle valve 48*a* is (substantially simultaneously) pushed by the applied pressure into a position in which the valve element 124*a* of the shuttle valve 48*a* closes the third flow-through path 108*a* and opens the fourth flow-through path 116*a*. In this way a fluidic connection of the second tank 68*a*, at which the pressure is applied, to the hydraulic effective surface 50*a* of the valve slide 14*a* is created. The applied pressure is thus forwarded to the hydraulic effective surface 50*a* of the valve slide 14*a*. In at least one further method step 126*a*, a resisting force of the valve slide 14*a* against a lifting of its sealing surface 26*a* from the valve seat 24*a* is adjusted by selecting an energization of the magnet coil 94*a* of the electromagnet 92*a*. In at least one further method step 128*a*, if the limit value given by the opening point 82*a* is exceeded by the applied pressure, the valve slide 14*a* is lifted from the valve seat 24*a*, such that pressure fluid can flow from the second tank 68*a* into the first tank 66*a* (or vice versa). In this way a damping of the applied pressure is created/achieved.

FIG. 7*a* shows a schematic hydraulic circuit diagram of the control valve 10*a* according to the invention. Apart from the hydraulic link valve 12*a* and apart from the further hydraulic link valve 54*a*, the flow-through hydraulic valve slide 14*a* has an orifice-free configuration 64*a*. FIG. 7*b* shows a schematic hydraulic circuit diagram of a control valve known from the prior art with a plurality of orifices 130*a* and check valves 132*a*.

A further exemplary embodiment of the invention is shown in FIGS. 8 and 9. The following descriptions and the drawings are substantially limited to the differences between the exemplary embodiments, wherein with regard to components having the same denomination, in particular with regard to components having the same reference numerals, reference may in principle also be made to the drawings and/or the description of the other exemplary embodiments, in particular of FIGS. 1 to 7*a*. To distinguish between the exemplary embodiments, the letter a has been added to the reference numerals of the exemplary embodiment in FIGS. 1 to 7*b*. In the exemplary embodiments of FIGS. 8 and 9, the letter a has been replaced by the letter b.

FIG. 8 schematically shows a perspective illustration of an alternative flow-through hydraulic valve slide 14*b*. The alternative valve slide 14*b* can be used in a control valve 10*b* which, apart from the valve slide 14*b*, is identical to the control valve 10*a* already described. The alternative valve slide 14*b* fulfils the same function as the valve slide 14*a* already described. The alternative valve slide 14*b* comprises an alternative hydraulic link valve 12*b*. The alternative hydraulic link valve 12*b* is integrated in the valve slide 14*b*. The alternative hydraulic link valve 12*b* is realized as a single valve. The single valve is realized as a 4/2 shuttle valve 60*b*. The 4/2 shuttle valve 60*b* combines the function of a shuttle valve with the function of a two-pressure valve in one valve.

FIG. 9 shows a schematic section through a portion of the alternative valve slide 14*b* and through the alternative hydraulic link valve 12*b* that is realized as a 4/2 shuttle valve 60*b*. The 4/2 shuttle valve 60*b* comprises a first control port 16*b*. The 4/2 shuttle valve 60*b* comprises a first entry 20*b*. In the case shown in FIG. 9, the first control port 16*b* and the first entry 20*b* coincide (in one element). The 4/2 shuttle valve 60*b* comprises a second control port 18*b*. The 4/2 shuttle valve 60*b* comprises a second entry 36*b*. The second entry 36*b* is fluidically connected to a second tank 68*b*. The external pressure of the shock absorber can be applied at the second entry 36*b*. In the case shown in FIG. 9, the second control port 18*b* and the second entry 36*b* are separate/different from each other. The 4/2 shuttle valve 60*b* comprises an exit 22*b*. The exit 22*b* is arranged/realized separately from the control ports 16*b*, 18*b* and from the entries 20*b*, 36*b*. Depending on an adjustment of the 4/2 shuttle valve 60*b*, the exit 22*b* can be opened in an interchangeable manner towards one of the entries 20*b*, 36*b*. The 4/2 shuttle valve 60*b* comprises a further exit 40*b*. The further exit 40*b* is arranged/realized separately from the control ports 16*b*, 18*b* and from the entries 20*b*, 36*b*. Depending on an adjustment of the 4/2 shuttle valve 60*b*, the further exit 40*b* can be opened in an interchangeable manner towards one of the entries 20*b*, 36*b*.

The 4/2 shuttle valve 60*b* is configured to open and/or keep open the entry 20*b*, 36*b*, to which the control port 16*b*, 18*b* having the lower pressure is assigned, towards the exit 22*b*. The 4/2 shuttle valve 60*b* is configured to at the same time open and/or keep open the entry 20*b*, 36*b*, to which the control port 16*b*, 18*b* having the higher pressure is assigned, towards the further exit 40*b*. The valve slide 14*b* comprises a flow channel 56*b* and a further flow channel 58*b*. The 4/2 shuttle valve 60*b* is assigned to both flow channels 56*b*, 58*b*. The flow channel 56*b* comprises a first flow-through path 112*b*. The first flow-through path 112*b* extends between a partial flow channel connected to the first entry 20*b* of the 4/2 shuttle valve 60*b* and to a first tank 66*b* of the control valve 10*b* and a partial flow channel connected to the exit 22*b* of the 4/2 shuttle valve 60*b* and to a hydraulic effective surface 50*b* that is situated opposite the first tank 66*b*. The flow channel 56*b* comprises a second flow-through path 114*b*. The second flow-through path 114*b* extends between a partial flow channel connected to the second entry 36*b* of the 4/2 shuttle valve 60*b* and to the second tank 68*b* of the control valve 10*b* and a partial flow channel connected to the exit 22*b* of the 4/2 shuttle valve 60*b* and to the hydraulic effective surface 50*b*. Both flow-through paths 112*b*, 114*b* of the flow channel 56*b* thus open into the partial flow channel that is connected to the exit 22*b* of the 4/2 shuttle valve 60*b*.

The further flow channel 58*b* comprises a third flow-through path 108*b*. The third flow-through path 108*b* extends between a partial flow channel connected to the first entry 20*b* of the 4/2 shuttle valve 60*b* and to the first tank 66*b* of the control valve 10*b* and a partial flow channel connected to the second exit 40*b* of the 4/2 shuttle valve 60*b* and to a pressure fluid reservoir 42*b* of the control valve 10*b*. The further flow channel 58*b* comprises a fourth flow-through path 116*b*. The fourth flow-through path 116*b* extends between a partial flow channel connected to the second entry 36*b* of the 4/2 shuttle valve 60*b* and to the second tank 68*b* of the control valve 10*b* and the partial flow channel connected to the second exit 40*b* of the 4/2 shuttle valve 60*b* and to the pressure fluid reservoir 42*b* of the control valve 10*b*. Both flow-through paths 108*b*, 116*b* of the further flow channel 58*b* thus open into the partial flow channel that is connected to the further exit 40*b* of the 4/2 shuttle valve 60*b*.

The 4/2 shuttle valve 60*b* is thus configured to open and/or keep open the entry 20*b*, 36*b*, which is assigned to that control port 16*b*, 18*b* of the two control ports 16*b*, 18*b* at which the higher pressure is applied, towards the exit 22*b* and at the same time to open and/or keep open the entry 20*b*, 36*b*, which is assigned to that control port 16*b*, 18*b* of the two control ports 16*b*, 18*b* at which the lower pressure is applied, towards the further exit 40*b*.

The 4/2 shuttle valve 60*b* comprises a first valve part 134*b* and a second valve part 136*b*. The first valve part 134*b* is inserted in a sealing manner into a recess 140*b* of the valve slide 14*b*. The first valve part 134*b* forms five regions 142*b*, 144*b*, 146*b*, 148*b*, 150*b* (first region 142*b*, second region 144*b*, third region 146*b*, fourth region 148*b*, fifth region 150*b*). The regions 142*b*, 144*b*, 146*b*, 148*b*, 150*b* are respectively sealable relative to each other (depending on a position of the second valve part 136*b*) and/or selectively combinable with respectively one of the further regions 142*b*, 144*b*, 146*b*, 148*b*, 150*b* (depending on a position of the second valve part 136*b*). The first region 142*b* is arranged in the axial direction 158*b* of the 4/2 shuttle valve 60*b* outside the 4/2 shuttle valve 60*b* on a first axial side 152*b* of the first valve part 134*b*. The second valve part 136*b* is supported so as to be movable in the axial direction 158*b*. The first region 142*b* is fluidically connected to the first tank 66*b*. The first region 142*b* is sealed at the outer circumference of the 4/2 shuttle valve 60*b* by a first seal 156*b* of the first valve part 134*b* with respect to the further regions 144*b*, 146*b*, 148*b*, 150*b*. The second region 144*b* is fluidically connected to the hydraulic effective surface 50*b*. The second region 144*b* is sealed at the outer circumference of the 4/2 shuttle valve 60*b* on one side by the first seal 156*b* with respect to the first region 142*b* and on an opposite-situated side by a second seal 160*b* of the first valve part 134*b* with respect to the further regions 146*b*, 148*b*, 150*b*. The third region 146*b* is fluidically connected to the second tank 68*b*. The third region 146*b* is sealed at the outer circumference of the 4/2 shuttle valve 60*b* on one side by the second seal 160*b* with respect to the first region 142*b* and the second region 144*b* and on an opposite-situated side by a third seal 162*b* of the first valve part 134*b* with respect to the further regions 148*b*, 150*b*. The fourth region 148*b* is fluidically connected to the pressure fluid reservoir 42*b*. The fourth region 148*b* is sealed at the outer circumference of the 4/2 shuttle valve 60*b* on one side by the third seal 162*b* with respect to the first region 142*b*, the second region 144*b* and the third region 146*b* and on an opposite-situated side by a fourth seal 164*b* of the first valve part 134*b* with respect to the fifth region 150*b*. The fifth region 150*b* is arranged in the axial direction 158*b* of the 4/2 shuttle valve 60*b* outside the 4/2 shuttle valve 60*b* on a second axial side 154*b* of the first valve part 134*b*. The fifth region 150*b* is fluidically connected to the second tank 68*b*. The fifth region 150*b* is sealed at the outer circumference of the 4/2 shuttle valve 60*b* by the fourth seal 164*b* of the first valve part 134*b* with respect to the further regions 142*b*, 144*b*, 146*b*, 148*b*.

The second valve part 136*b* is arranged within the first valve part 134*b*. The second valve part 136*b* is arranged so as to be axially movable in the first valve part 134*b*. The second valve part 136*b* glides in a sealing manner within a recess 138*b* of the first valve part 134*b*. The second valve part 136*b* forms a combination-valve valve slide 62*b* that is at least section-wise capable of being flowed through. The second valve part 136*b* is configured to be moved back and forth between a first valve position 166*b* and a second valve position 168*b*. In FIG. 9, the second valve part 136*b* is in the first valve position 166*b*, while the second valve position 168*b* is indicated only by dashed lines. The second valve part 136*b* is configured to be brought into the respective valve position 166*b*, 168*b* by the pressures applied at the control ports 16*b*, 18*b*. For this purpose, the second valve part 136*b* comprises a first pressure-application surface 170*b* and a second pressure-application surface 172*b*. The first pressure-application surface 170*b* is configured for applying a pressure from the first tank 66*b*/from the first control port 16*b*. The second pressure-application surface 172*b* is configured for applying a pressure from the second tank 68*b*/from the second control port 18*b*. The flow-through combination-valve valve slide 62*b* comprises a flow-through recess 174*b*. The flow-through recess 174*b* can be filled with the pressure fluid/flowed through by the pressure fluid. The flow-through recess 174*b* is open axially towards the first axial side 152*b*. The flow-through recess 174*b* is closed axially towards the second axial side 154*b*. In an end region 176*b* of the second valve part 136*b* situated at the second axial side 154*b*, the flow-through recess 174*b* comprises at least one inflow and/or outflow opening 178*b*, which enables an inflow and/or an outflow of pressure fluid in a direction 180*b* that is radial to the axial direction 158*b*. Along the remaining portion of its extent in the axial direction 158*b*, the second valve part 136*b* is free of further inflow and/or outflow openings. The first pressure-application surface 170*b* and the second pressure-application surface 172*b* are both arranged in the same end region 176*b* of the second valve part 136*b*, in particular in the end region 176*b* of the second valve part 136*b* that is situated at the second axial side 154*b*. The first pressure-application surface 170*b* is arranged within the flow-through recess 174*b* of the second valve part 136*b*.

The second pressure-application surface 172*b* is arranged outside the flow-through recess 174*b* of the second valve part 136*b*. The second pressure-application surface 172*b* is arranged on an axial outer surface of the second valve part 136*b*.

In the second region 144*b*, the first valve part 134*b* comprises at least one inflow and/or outflow opening 182*b* on an outer circumference that is, in particular with respect to the axial direction 158*b*, situated in the radial direction 180*b*, said inflow and/or outflow opening 182*b* permitting a fluidic connection from an inner space of the first valve part 134*b* to the further hydraulic effective surface 54*b*. In the third region 146*b*, the first valve part 134*b* comprises, on an outer circumference that is, in particular with respect to the axial direction 158*b*, situated in a radial direction 180*b*, at least one inflow and/or outflow opening 184*b* permitting a fluidic connection from the inner space of the first valve part 134*b* to the second tank 68*b*. In the fourth region 148*b*, the first valve part 134*b* comprises, on an outer circumference that is, in particular with respect to the axial direction 158*b*, situated in a radial direction 180*b*, at least one inflow and/or outflow opening 186*b* permitting a fluidic connection from the inner space of the first valve part 134*b* to the pressure fluid reservoir 42*b*. The first region 142*b* and the fifth region 150*b* are in each case connected to the inner space of the first valve part 134*b* by axial inflow and/or outflow openings 188*b*, 190*b*.

In the first valve position 166*b*, the first region 142*b* is fluidically connected to the second region 144*b*. In the first valve position 166*b*, the third region 146*b* is fluidically connected to the fourth region 148*b*. In the first valve position 166*b*, the fifth region 150*b* is fluidically connected to none of the further regions 142*b*, 144*b*, 146*b*, 148*b*. In the first valve position 166*b*, the first region 142*b* and the second region 144*b* are fluidically separate from the further regions 146*b*, 148*b*, 150*b*. In the first valve position 166*b*, the third region 146*b* and the fourth region 148*b* are fluidically separate from the further regions 142*b*, 144*b*, 150*b*.

In the second valve position 168*b*, the first region 142*b* is fluidically connected to the fourth region 148*b*. In the second valve position 168*b*, the second region 144*b* is fluidically connected to the third region 146*b*. In the second valve position 168*b*, the fifth region 150*b* is fluidically connected to none of the further regions 142*b*, 144*b*, 146*b*, 148*b*. In the second valve position 168*b*, the volume of the fifth region 150*b* is larger than in the first valve position 166*b*. In the second valve position 168*b*, the first region 142*b* and the fourth region 148*b* are fluidically separate from the further regions 144*b*, 146*b*, 150*b*. In the second valve position 168*b*, the second region 144*b* and the third region 146*b* are fluidically separate from the further regions 142*b*, 148*b*, 150*b*.

REFERENCE NUMERALS

10 control valve
12 link valve
14 valve slide
16 first control port
18 second control port
20 first entry
22 exit
24 valve seat
26 sealing surface
28 first side
30 second side
32 third side
34 movement direction
36 second entry
38 two-pressure valve
40 further exit
42 pressure fluid reservoir
44 region
46 further branching
48 shuttle valve
50 hydraulic effective surface
52 further hydraulic effective surface
54 further link valve
56 flow channel
58 further flow channel
60 4/2 shuttle valve
62 combination-valve valve slide
64 orifice-free configuration
66 first tank
68 second tank
70 vehicle
72 damping characteristic diagram
74 abscissa
76 ordinate
78 zero point
80 leakage
82 opening point
84 first pressure port
86 second pressure port
88 valve housing
90 valve seat element
92 electromagnet
94 magnet coil
96 magnetic core
98 main armature
100 air gap
102 compression spring
104 magnet housing
106 tappet element
108 third flow-through path
110 branching
112 first flow-through path
114 second flow-through path
116 fourth flow-through path
118 method step
120 valve slide
122 method step
124 valve element
126 method step
128 method step
130 orifice

132 check valve
134 first valve part
136 second valve part
138 recess
140 recess
142 first region
144 second region
146 third region
148 fourth region
150 fifth region
152 first axial side
154 second axial side
156 first seal
158 axial direction
160 second seal
162 third seal
164 fourth seal
166 first valve position
168 second valve position
170 first pressure-application surface
172 second pressure-application surface
174 flow-through recess
176 end region
178 inflow and/or outflow opening
180 radial direction
182 inflow and/or outflow opening
184 inflow and/or outflow opening
186 inflow and/or outflow opening
188 axial inflow and/or outflow opening
190 axial inflow and/or outflow opening

The invention claimed is:

1. A bidirectional control valve, having a valve seat and a flow-through hydraulic valve slide which comprises a sealing surface that is configured to tightly sit on the valve seat, wherein the flow-through hydraulic valve slide comprise at least one hydraulic link valve for influencing a flow-through of the valve slide, wherein the at least one hydraulic link valve is entirely integrated into the flow-through hydraulic valve slide, and wherein the at least one hydraulic link valve that is entirely integrated into the flow-through hydraulic valve slide comprises at least one first control port, at least one second control port, at least one entry and at least one exit which can be opened in an interchangeable manner at least towards the entry.

2. The bidirectional control valve according to claim 1, wherein the at least one first control port is hydraulically connected to a first side of the valve slide, wherein the at least one second control port is hydraulically connected to a second side of the valve slide, and wherein the two sides to which the at least one first control port and the at least one second control port are hydraulically connected are arranged on the valve slide in such a way that the first side and the second side can be sealed relative to each other by the sealing surface.

3. The bidirectional control valve according to claim 2, wherein the exit is hydraulically connected to a third side of the valve slide, which is arranged opposite the sealing surface as viewed in a designated movement direction of the valve slide.

4. The bidirectional control valve according to claim 1, wherein the at least one integrated hydraulic link valve is realized as a two-pressure valve, which is configured to open and/or keep open the entry to which the control port of the at least one first control port and the at least one second control port having the lower pressure is assigned towards the exit.

5. The bidirectional control valve according to claim 4, wherein the exit of the two-pressure valve is hydraulically connected to a region of the valve slide that at least partially delimits a pressure fluid reservoir of the control valve, the pressure fluid reservoir being configured to be filled and/or emptied during a movement of the valve slide via a flow-through path that is controlled at least by the two-pressure valve.

6. The bidirectional control valve according to claim 1, wherein the at least one integrated hydraulic link valve is realized as a shuttle valve, which is configured to open and/or keep open the entry to which the control port of the at least one first control port and the at least one second control port having the higher pressure is assigned towards the exit.

7. The bidirectional control valve according to claim 6, wherein the exit of the shuttle valve is hydraulically connected to a hydraulic effective surface, which is situated opposite a further hydraulic effective surface that is realized on the side of the valve slide towards which the shuttle valve is currently open.

8. The bidirectional control valve according to claim 7, wherein the opposite-situated hydraulic effective surfaces have different dimensions.

9. The bidirectional control valve according to claim 1, wherein the flow-through hydraulic valve slide comprise at least one integrated further hydraulic link valve, which differs from the at least one integrated hydraulic link valve in a functional principle, for influencing a flow-through of the valve slide, the at least one integrated further hydraulic link valve comprising at least one first control port and at least one second control port.

10. The bidirectional control valve according to claim 9, wherein the at least one integrated hydraulic link valve is realized as a two-pressure valve and that the at least one integrated further hydraulic link valve is realized as a shuttle valve.

11. The bidirectional control valve according to claim 9, wherein the at least one integrated hydraulic link valve is assigned to a flow channel realized at least partially by the valve slide and that the at least one integrated further hydraulic link valve is assigned to a further flow channel realized at least partially by the valve slide, wherein the two flow channels are realized completely separate from each other.

12. The bidirectional control valve according to claim 1, wherein the at least one integrated hydraulic link valve is realized as a single valve, which has at least one further exit and which combines the function of a shuttle valve with the function of a two-pressure valve in one valve.

13. The bidirectional control valve according to claim 12, wherein the single valve is realized as a 4/2 shuttle valve configured to open and/or keep open the entry, which is assigned to that control port of the two control ports at which a higher pressure is applied, towards the exit and at the same time to open and/or keep open the entry, which is assigned to that control port of the two control ports at which a lower pressure is applied, towards the further exit.

14. The bidirectional control valve according to claim 12, wherein the at least one integrated hydraulic link valve is realized as a 4/2 shuttle valve and comprises a combination-valve valve slide that is at least section-wise capable of being flowed through.

15. The bidirectional control valve according to claim 1, wherein the flow through hydraulic valve slide comprise an orifice-free configuration.

16. The bidirectional control valve according to claim 1, comprising achieving a capability for regulating a pressure drop at the valve slide, starting from a volume flow of less than 10 l/min.

17. The bidirectional control valve according to claim 1, with a first tank and with a second tank that is separable from the first tank by the valve slide, comprising a pressure fluid reservoir the volume of which is variable by a movement of the valve slide, which is realized separately from the tanks and which is partially fillable and/or partially emptyable by a flow-through of the valve slide, wherein the at least one integrated hydraulic link valve realized as a two-pressure valve is configured to automatically and dynamically create a valve-slide flow-through connection between the pressure fluid reservoir and only that one of the two tanks which currently has a lower pressure load.

18. A vehicle with a bidirectional control valve according claim 1.

19. A method for an automatic adjustment of instantaneous flow-through directions by means of flow-through valve slides, comprising: using a bidirectional control valve according to claim 1, wherein the instantaneous flow-through directions are automatically adjusted dynamically by a two-pressure valve and a shuttle valve, or by a 4/2 shuttle valve.

* * * * *